June 28, 1938.  E. L. ROSE ET AL  2,122,045
POWER TRANSMISSION
Filed Oct. 22, 1935
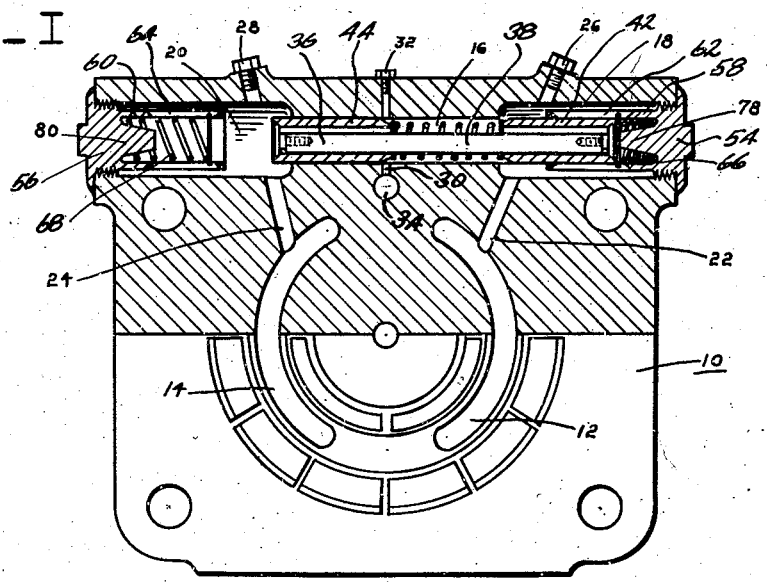
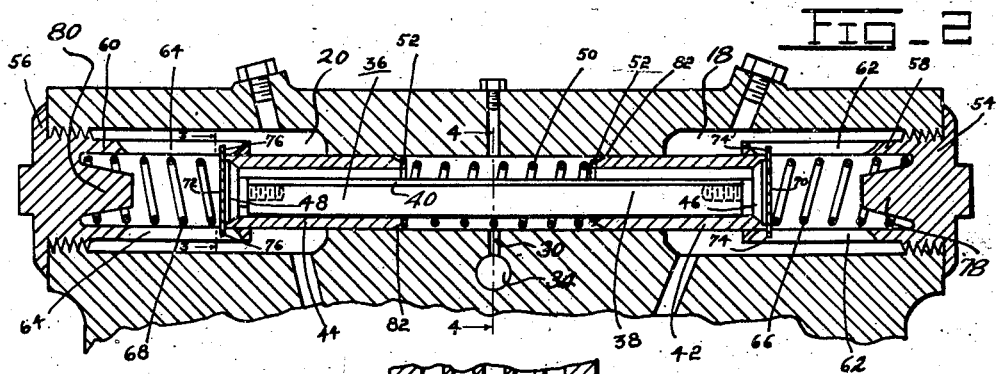
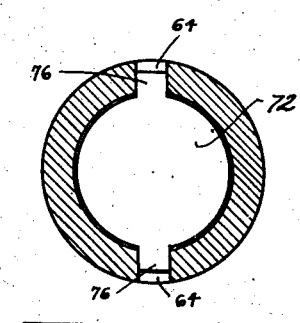
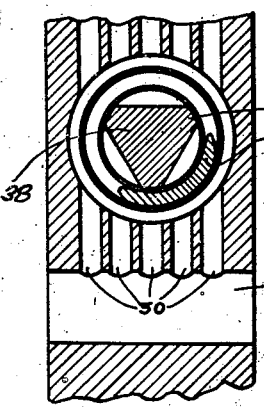
INVENTORS
EDWIN L. ROSE
RALPH L. TWEEDALE
BY
Ralph L. Tweedale
ATTORNEY Patented June 28, 1938

2,122,045

UNITED STATES PATENT OFFICE 2,122,045

POWER TRANSMISSION

Edwin L. Rose and Ralph L. Tweedale, Waterbury, Conn., assignors to The Waterbury Tool Company, Waterbury, Conn., a corporation of Connecticut Application October 22, 1935, Serial No. 46,142

15 Claims. (Cl. 60—53)

This invention relates to power transmissions of the type which include one or more energy translating devices for converting mechanical motion to movement of a fluid under pressure or vice versa. Transmissions of this class usually comprise a fluid pump connected in a closed circuit with a fluid motor. In apparatus of this type which operates upon a substantially incompressible fluid, it is important to insure that the fluid circuit is maintained full of liquid at all times. It has also been found necessary particularly where a variable displacement pump or motor is in the circuit to prevent the building up of excessively high pressures in the circuit under abnormal operating conditions.

In a fluid power transmission of the type illustrated in Patent to Janney, 924,787, for example, in which the fluid pump is variable in displacement and is also reversible in the sense that the direction of fluid flow may be reversed without reversing the direction of motion of the operating shaft, it has heretofore been customary to provide duplicate replenishing valves as well as duplicate relief valves to accomplish these purposes. These valves are usually mounted in bores formed in a part of the casing of the transmission and constructions heretofore utilized have necessitated not only a large number of bores and connecting passages but also unnecessary duplication of the valves themselves, resulting in undesirably high cost of the apparatus.

It is an object of the present invention, therefore, to provide a single unitary valve structure which may be incorporated in a reversible flow fluid power transmission which will insure the proper replenishment of leakage fluid and also prevent excess pressure regardless of the direction of fluid flow within the transmission.

It is also an object to provide a shuttle type replenishing valve for a reversible flow fluid power transmission, which is positively maintained in operative position during normal operation and is also positively operable to reverse the connections for replenishing upon reversal of the direction of fluid flow.

A further object is to provide relief valve means which permit the use of a very light and inexpensive spring for maintaining the valve closed.

It is also an object to provide a relief valve mechanism for a reversible flow fluid power transmission in which a single spring takes care of the relief of excess pressure regardless of the direction of fluid flow in the transmission.

Further objects and advantages of the present invention will be apparent from the following description, reference being had to the accompanying drawing wherein a preferred form of the present invention is clearly shown.

In the drawing:

Figure 1 is a side elevation partly in section of a valve plate constructed according to the present invention.

Figure 2 is a fragmentary cross-sectional view of Figure 1, showing the parts in a different position.

Figure 3 is a cross-sectional view taken on line 3—3 of Figure 2.

Figure 4 is a cross-sectional view taken on line 4—4 of Figure 2.

Referring now to Figure 1, there is illustrated a valve plate 10 which may be associated with a fluid power transmission of the well-known Waterbury type, such as illustrated in the Janney patent referred to. Valve plate 10 is adapted to form an operating partition between the pump and motor casings of the power transmission or it may form alternatively an end closure for the casing of either, where the pump and motor are spaced from each other and connected by piping. The valve plate 10 cooperates with the cylinder valve to form respectively transposable high side and low side passages 12 and 14. The passages 12 and 14 together with the pump and motor form a closed fluid circuit.

For the purposes of the present invention the valve plate 10 is provided with a transverse bore 16 having enlarged portions 18 and 20 at its opposite ends. The enlarged portion 18 is in communication with the passage 12 through a conduit 22 while a similar conduit 24 connects the enlarged portion 20 with the passage 14. The conduits 22 and 24 may be formed by drilling from the outside of the valve plate, the outer ends being closed with plugs 26 and 28. The mid-portion of the bore 16 communicates with a source of replenishing fluid through a passage or conduit formed by a plurality of drill holes 30 (see Figure 4), the holes 30 being closed at their outer ends by plugs 32. A bore 34 connects the lower ends of the holes 30 and is in communication with a source of replenishing fluids; for example, the idle fluid maintained within the casing of either the fluid motor or the fluid pump or both. Slidably mounted within the bore 16 is a shuttle valve unit 36. The valve unit 36 includes a central longitudinal stem 38 of generally triangular cross section having cylindrical portions 40 upon which are slidably mounted a pair of hollow cylindrical sleeves 42 and 44 which form piston-like portions on the valve unit 36. The sleeves 42 and 44 engage the walls of the bore 16 with a freely slidable but substantially fluid tight fit.

At either end of the stem 38 there is securely fastened thereto one of a pair of plugs or heads 46 and 48 adapted to coact with the outer end of the sleeves 42 and 44 to provide a fluid tight enclosure for the same. A spring 50 surrounds the stem 38 between the sleeves 42 and 44 to urge the sleeves outwardly to fluid tight engagement with the heads 46 and 48. Adjustment washers 52 may be provided when the valve unit is assembled and may be replaced with washers of different thickness for adjustment of the spring pressure exerted on the sleeves 42 and 44.

The enlarged portions 18 and 20 of the bore 16 are closed at their outer ends by screw threaded closure members 54 and 56. The closure members 54 and 56 have integral tubular extensions 58 and 60 respectively which have an internal cross-section corresponding to and in alignment with the bore 16. Slots 62 and 64 are formed in the tubular extensions to terminate short of the end of the extensions for a purpose later to be described. Within each of the extensions 58 and 60 there is mounted one of a pair of light valve centering springs 66 and 68 which are slightly pre-stressed in their extended position by a pair of retaining members 70 and 72. The retaining members are provided with lugs 74 and 76 which extend into the slots 62 and 64 respectively, thus limiting the expansion of the springs 66 and 68. The tubular extensions 58 and 60 form guide means for the sleeves 42 and 44 which are necessary to maintain alignment whenever the shuttle valve unit is moved to a position in which either sleeve lies entirely outside of the bore 16.

In operation of the device whenever the fluid pump of the power transmission is idle or is operating at zero displacement so that no fluid is being pumped, the pressures in the passages 12 and 14 will be substantially equal. Under these conditions the valve unit 36 is maintained in the neutral position illustrated in Figure 2 by the force of the springs 66 and 68 acting through the retainer members 70 and 72 upon the heads 46 and 48. Whenever the pump is in operation and the displacement thereof and the load on the power transmission are such that pressure is built up in the passage 14, the passage 12 may be referred to as the low side of the transmission and the passage 14 as the high side of the transmission. Under these conditions the pressure within the enlarged portion 20 predominates to overcome the force of the spring 66 and move the valve unit 36 as a whole to the right as illustrated in Figure 1. The movement of the valve unit in this direction is limited by a stop 78 formed on the closure member 54. The axial dimensions of the bore 16 and the sleeves 42 and 44 are so chosen that with the valve unit 36 against the stop 78, the sleeve 42 is entirely out of the bore 16, while the sleeve 44 moves up to the edge of the conduit formed by the drill holes 30. With the valve in this position a substantially unrestricted path for replenishing fluid is open. This path comprises the bore 34, the drill holes 30, the bore 16, the enlarged portion 18 and the conduit 22 to the low side passage 12. The springs 66 and 68 may be made comparatively light so that the valve moves to the position in Figure 1 upon a very slight pressure difference between the passages 12 and 14. When the high side pressure reaches an excessive value, the left hand end of the sleeve 44 which is exposed to the resultant axial force of the fluid pressure within the enlarged portion 20 receives a force sufficient to compress the spring 50 and permit the sleeve 44 to move to the right relative to the remainder of the valve unit 36. A relief path is thus opened from the passage 14 directly to the passage 12 through the conduit 24, the enlarged portion 20, the space between the head 48 and the sleeve 44, the passages between the sleeve 44 and the stem 38, the bore 16, the enlarged portion 18 and conduit 22. Thus, the fluid circuit is effectively shunted or by-passed until sufficient fluid has been relieved to permit the pressure to drop to normal operating value when the sleeve 44 takes up its normal position under the influence of spring 50.

It will be noted that the area of the sleeve 44 exposed to axial pressure forces is small so that a comparatively light spring 50 may be used to maintain the sleeve 44 against the head 48 at high operating pressures. This annular area may be made substantially no greater than the area of opening between the end of the sleeve 44 and the head 48. In addition, the shape of the head 48 and the coacting portion of the sleeve 44 is such that as soon as the relief valve formed thereby opens, a larger net annular area of the sleeve 44 is exposed thus further opening the relief valve.

When the sleeve 44 moves to the right to open the relief valve, the right hand end thereof moves across the passage or conduit formed by the drill holes 30 to cut off the bore 16 and the rest of the normal replenishing path from the source of replenishing fluid, thus effectively preventing the exhaustion of relieved fluid to the replenishing source. In addition, the sleeves 42 and 44 may be beveled as shown at 82 for the purpose of causing a Venturi effect while the sleeve 44 is only partially over the drill holes 30. Thus with the sleeve 44 moved to the right so that the bevel portion 82 does not completely close the holes 30, the relieved fluid passing through the interior of sleeve 44 leaves the right-hand end thereof at a high velocity. Upon entering the bore 16 its velocity is reduced so that at the holes 30 the bevel 82 induces a suction effect tending to draw fluid from the holes 30 along with the major current flowing through the interior of sleeve 44.

Upon operation of the transmission in the reverse direction the passages 12 and 14 are transposed in respect to the high and low pressures so that the passage 12 is on the high side and the passage 14 is on the low side. The valve unit 36 operates in an exactly analogous manner to open a replenishing path from the bore 34 to the passage 14, stop means 80 similar to 78 being provided on member 56 and upon excess pressure being developed in the passage 12 opens a relief path directly from passage 12 to passage 14.

Whenever the pressure conditions in the fluid circuit go through a neutral point in changing from one condition to another, either the spring 66 or the spring 68, together with retainer 70 or 72 acts to move the valve unit 36 to the neutral position illustrated in Figure 2 so that thereafter the valve unit may be positively actuated into normal operative position. Whenever the valve is acting to relieve excess pressure, it will be seen that whichever of the enlarged portions 18 or 20 is on the low pressure side forms, together with the corresponding conduit 22 or 24, an outlet for the relieved fluid.

It will thus be seen that the present invention provides a unitary valve structure for a reversible flow fluid power transmission which is not only simple and economical to construct but is positive in its operation under all conditions encountered in use.

While the form of embodiment of the invention as herein disclosed, constitutes a preferred form, it is to be understood that other forms might be adopted, all coming within the scope of the claims which follow.

What is claimed is as follows:

1. In combination with a fluid pressure energy translating device having a pair of fluid passages with respect to which the high and low pressure sides of the device are transposable, a combined replenishing and relief valve comprising means defining a valve bore, means forming a conduit communicating between said bore and a source of replenishing fluid, conduit means connecting the bore at spaced points with each of said fluid passages, a valve unit reciprocable in the bore and having portions oppositely exposed to the pressure in said fluid passages and operable in response to pressure in either of said passages to open the other passage to the replenishing source, and means responsive to excessive pressure for causing said valve unit to open communication between the passage which is under pressure and a point of low pressure.

2. In combination with a fluid pressure energy translating device having a pair of fluid passages with respect to which the high and low pressure sides of the device are transposable, a combined replenishing and relief valve comprising means defining a valve bore, means forming a conduit communicating between said bore and a source of replenishing fluid, conduit means connecting the bore at spaced points with each of said fluid passages, a valve unit reciprocable in the bore and having portions oppositely exposed to the pressure in said fluid passages and operable in response to pressure in either of said passages to open the other passage to the replenishing source, and means responsive to excessive pressure for causing said valve unit to open communication between the passage which is under pressure and the other passage through said bore.

3. In combination with a fluid pressure energy translating device having a pair of fluid passages with respect to which the high and low pressure sides of the device are transposable, a combined replenishing and relief valve comprising means defining a valve bore, means forming a conduit communicating between said bore and a source of replenishing fluid, conduit means connecting the bore at spaced points with each of said fluid passages, a valve unit reciprocable in the bore and having portions oppositely exposed to the pressure in said fluid passages and operable in response to pressure in either of said passages to open the other passage to the replenishing source, and means responsive to excessive pressure for causing said valve unit to open communication between the passage which is under pressure and the other passage through said bore and to interrupt communication between said other passage and the replenishing source.

4. In a pressure fluid circuit having a pair of passages which may be interchangeably subjected respectively to high and low pressure fluid the combination of means defining a single valve bore having communication at spaced points with each of said passages and with a source of replenishing fluid, and a single valve unit reciprocable in said bore operable in response to fluid pressure to connect the replenishing source with the passage which is exposed to low pressure and to limit the pressure developed in the high pressure passage to a predetermined maximum value.

5. In a pressure fluid circuit having a pair of passages which may be interchangeably subjected respectively to high and low pressure fluid the combination of a bore having communication with each of said passages at opposite respective ends of the bore and with a third passage at an intermediate point, a shuttle valve unit reciprocable in the bore to place the third passage in communication with either one of the first mentioned passages in response to fluid pressure in the other one, and means for moving the valve unit to a neutral position closing off communication of the third passage with both of the first mentioned passages when both passages lack operating pressure.

6. In a pressure fluid circuit having a pair of passages which may be interchangeably subjected respectively to high and low pressure fluid the combination of a bore having communication with each of said passages at opposite respective ends of the bore and with a third passage at an intermediate point, a shuttle valve unit reciprocable in the bore to place the third passage in communication with either one of the first mentioned passages in response to fluid pressure in the other one, and resilient means for moving the valve unit to a neutral position from either operating position, for closing off communication of the third passage with both of the first mentioned passages when both passages lack operating pressure.

7. In a pressure fluid circuit having a pair of passages which may be interchangeably subjected respectively to high and low pressure fluid the combination of a bore having communication with each of said passages at opposite respective ends of the bore and with a third passage at an intermediate point, a shuttle valve unit reciprocable in the bore to place the third passage in communication with either one of the first mentioned passages in response to fluid pressure in the other one, and resilient means for moving the valve unit to a neutral position from either operating position, for closing off communication of the third passage with both of the first mentioned passages when both passages lack operating pressure and means for prestressing said resilient means at neutral position.

8. In a fluid power transmission device the combination of means for converting energy between a moving member and a body of fluid under pressure at varying fluid pressures, respectively transposable high side and low side fluid passages for said means, a shuttle valve for selectively connecting a source of replenishing fluid with whichever of the passages is on the low side at any time, and means associated with the shuttle valve for relieving excess pressure in whichever passage is on the high side.

9. In a fluid power transmission device the combination of means for converting energy between a moving member and a body of fluid under pressure at varying fluid pressures, respectively transposable high side and low side fluid passages for said means, a shuttle valve for selectively connecting a source of replenishing fluid with whichever of the passages is on the low side at any time, and means for relieving excess pressure in whichever passage is on the high side directly through the shuttle valve.

10. In a fluid power transmission device the combination of means for converting energy between a moving member and a body of fluid under pressure at varying fluid pressures, respectively transposable high side and low side fluid passages for said means, a single valve bore communication at its opposite ends with each of said passages respectively, valve means in said bore for selectively connecting a source of replenishing fluid with either one of the passages, and means in said bore for relieving excess pressure in either passage through said bore.

11. In a fluid pressure circuit having a pair of passages which may be interchangeably subjected respectively to high and low pressure fluid the combination of means forming a bore having communication at its opposite ends with each of the passages respectively and at an intermediate point communicating with a source of replenishing fluid, a valve member slidable in the bore having two spaced piston-like portions exposed to the opposite ends of the bore, said portions being spaced to close communication between the replenishing fluid source and both of the passages in one position of the valve and to provide unrestricted communication between the replenishing fluid source and the low side passage in a second position of the valve, and resilient means urging the valve into the first position, the portion exposed to the pressure of the high side passage serving as a piston to move the valve into the second position.

12. In a fluid pressure circuit having a pair of passages which may be interchangeably subjected respectively to high and low pressure fluid the combination of means forming a bore having communication at its opposite ends with each of the passages respectively and at an intermediate point communicating with a source of replenishing fluid, a valve member slidable in the bore having two spaced piston-like portions exposed to the opposite ends of the bore, said portions being spaced to close communication between the replenishing fluid source and both of the passages in one position of the valve and to provide unrestricted communication between the replenishing fluid source and the low side passage in a second position of the valve, and resilient means urging the valve into the first position, the portion exposed to the pressure of the high side passage serving as a piston to move the valve into the second position, and means for guiding the valve member when one of the portions is out of the bore.

13. A fluid power transmission comprising in combination a fluid pressure energy translating device having a pair of fluid passages with respect to which the high and low pressure sides of the device are transposable, a combined replenishing and relief valve structure adapted to selectively open a path between the low pressure side and a source of replenishing fluid during normal operation of the transmission, and to open the high pressure side to said path upon abnormal pressure rise in the high side and means associated with said valve structure for isolating the replenishing source from said path upon an abnormal pressure rise in the high pressure side.

14. A fluid power transmission comprising in combination a reversible and selectively variable fluid displacement device including a valve plate having a pair of fluid passages with respect to which the high and low pressure sides of the device are transposable, variable displacement means coacting with the valve plate, means forming a valve bore associated with the valve plate and communicating at its opposite ends with the respective passages, means forming a conduit between an intermediate point in the bore and a source of replenishing fluid, and a shuttle valve slidably mounted in the bore, said shuttle valve including a longitudinal stem having head portions at its ends, a pair of sleeves slidably mounted on said stem, resilient means normally urging the sleeves outwardly against the heads, and means forming a fluid passage between the interior of the sleeves and the stem normally closed by said head portions, said shuttle valve being movable to connect the source of replenishing fluid with the low pressure side of the device, and the sleeve exposed to the high pressure side being movable relative to the stem to connect the high pressure side to the low pressure side through the last mentioned passage between the sleeve and stem upon attaining a predetermined pressure differential between the high and low pressure sides.

15. A fluid power transmission comprising in combination a reversible and selectively variable fluid displacement device including a valve plate having a pair of fluid passages with respect to which the high and low pressure sides of the device are transposable, variable displacement means coacting with the valve plate, means forming a valve bore associated with the valve plate and communicating at its opposite ends with the respective passages, means forming a conduit between an intermediate point in the bore and a source of replenishing fluid, the junction of said conduit with the bore being of limited extent axially of the bore in comparison to its extent transversely of the bore, and a shuttle valve slidably mounted in the bore, said shuttle valve including a longitudinal stem having head portions at its ends, a pair of sleeves slidably mounted on said stem, resilient means normally urging the sleeves outwardly against the heads, and means forming a fluid passage between the interior of the sleeves and the stem normally closed by said head portions, said shuttle valve being movable to connect the source of replenishing fluid with the low pressure side of the device, and the sleeve exposed to the high pressure side being movable relative to the stem to connect the high pressure side to the low pressure side through the last mentioned passage between the sleeve and stem upon attaining a predetermined pressure differential between the high and low pressure sides.

EDWIN L. ROSE.
RALPH L. TWEEDALE.